United States Patent
Ye

(10) Patent No.: US 11,842,008 B2
(45) Date of Patent: Dec. 12, 2023

(54) SELF-CAPACITANCE TOUCH SCREEN, METHOD OF DETECTING THEREOF, AND DEVICE FOR DETECTING THEREOF

(71) Applicant: WUHAN CHINA STAR OPTOELECTRONICS SEMICONDUCTOR DISPLAY TECHNOLOGY CO., LTD., Wuhan (CN)

(72) Inventor: Jian Ye, Wuhan (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 287 days.

(21) Appl. No.: 17/278,240

(22) PCT Filed: Dec. 3, 2020

(86) PCT No.: PCT/CN2020/133577
§ 371 (c)(1),
(2) Date: Mar. 19, 2021

(87) PCT Pub. No.: WO2022/073291
PCT Pub. Date: Apr. 14, 2022

(65) Prior Publication Data
US 2023/0119601 A1    Apr. 20, 2023

(30) Foreign Application Priority Data
Oct. 9, 2020   (CN) .................. 202011075035.3

(51) Int. Cl.
*G06F 3/044* (2006.01)
*G06F 3/041* (2006.01)

(52) U.S. Cl.
CPC ...... *G06F 3/041662* (2019.05); *G06F 3/0446* (2019.05); *G06F 3/04164* (2019.05)

(58) Field of Classification Search
CPC .......... G06F 3/041662; G06F 3/04164; G06F 3/0446; G06F 3/044; G06F 3/041
See application file for complete search history.

(56) References Cited

U.S. PATENT DOCUMENTS

2016/0092019 A1* 3/2016 Huang .................. G06F 3/0443
345/174
2016/0320886 A1* 11/2016 Kim ........................ G06F 3/047
(Continued)

FOREIGN PATENT DOCUMENTS

| CN | 102799325 A | 11/2012 |
|---|---|---|
| CN | 103454823 A | 12/2013 |

(Continued)

*Primary Examiner* — Md Saiful A Siddiqui
(74) *Attorney, Agent, or Firm* — PV IP PC; Wei Te Chung; Zhigang Ma

(57) ABSTRACT

A self-capacitance touch screen, a method of detecting thereof, and a device for detecting thereof are provided. The method of detecting the self-capacitance touch screen includes following steps: outputting same driving signals to a to-be-scanned sensor pad group and an adjacent sensor pad group and correspondingly recognizing coordinates of touch points according to changes in received driving signals.

6 Claims, 5 Drawing Sheets

(56) References Cited

U.S. PATENT DOCUMENTS

2017/0228572 A1* 8/2017 Lee .................... G06V 40/1329
2018/0150183 A1* 5/2018 Putra ....................... G06F 3/044

FOREIGN PATENT DOCUMENTS

| CN | 105786287 A | 7/2016 |
| CN | 106201141 A | 12/2016 |
| CN | 107045412 A | 8/2017 |
| CN | 108139843 A | 6/2018 |
| CN | 109976567 A | 7/2019 |
| JP | 2020166656 A | 10/2020 |

* cited by examiner

SELF-CAPACITANCE TOUCH SCREEN, METHOD OF DETECTING THEREOF, AND DEVICE FOR DETECTING THEREOF

RELATED APPLICATIONS

This application is a Notional Phase of PCT Patent Application No. PCT/CN2020/133577 having international filing date of Dec. 3, 2020, which claims the benefit of priority of Chinese Patent Application Nos. 202011075035.3 filed on Oct. 9, 2020. The contents of the above applications are all incorporated by reference as if fully set forth herein in their entirety.

FIELD

The present disclosure relates to the field of touch screen technologies, and more specifically, to a method of detecting a self-capacitance touch screen, a corresponding device for detecting a self-capacitance touch screen, and a self-capacitance touch screen.

BACKGROUND

Nowadays, flexible active-matrix organic light-emitting diode (AMOLED) on-cell touch screens of smartphones are typically mutual-capacitance touch screens (AMOLED means active-matrix organic light-emitting diode, on-cell is a process that embeds a touch panel between a color filter substrate and a polarizer, mutual-capacitance touch screen is also called mutual-DOT, and DOT means direct on-cell touch).

Layouts of mutual-capacitance touch screens are a combination of multiple electrode channels which are continuously horizontally conducted to each other and multiple electrode channels which are continuously vertically conducted to each other, leading to a relatively large RC load of the electrode channels, especially in large touch screens. Consequently, a number of parasitic capacitances may be excessive, which current mutual-capacitance touch screen integrated chips (Mutual Touch IC) cannot endure. Self-capacitance touch screens (Self-DOT) correspond to mutual-capacitance touch screens. Although self-capacitance touch screens also include horizontal electrodes and vertical electrodes, sensor pads (Sensor Pad) thereof are individual. Therefore, each of the sensor pads has a relatively small RC load. Thus, self-capacitance touch screens are usually applied to large touch screens.

Generally, when touch signals of self-capacitance touch screens are detected, driving signals are inputted into sensor pad groups group by group, and coordinates of touchpoints are correspondingly outputted according to changes in received driving signals. Taking a self-capacitance touch screen with 14 columns and 30 rows as an example, there are 14×30=420 sensor pads in the self-capacitance touch screen. Each sensor pad group includes three rows of the sensor pads. When touch signals of the self-capacitance screen are detected, driving signals, e.g., high-frequency positive voltage amplitude square wave signals, are sequentially inputted into an uppermost sensor pad group (the sensor pads from first to third rows) to a lowest sensor pad group (the sensor pads from 40th to 42nd rows). Since the driving signals are inputted into the sensor pad groups group by group, a potential difference is generated between the sensor pad groups which the driving signals are inputted into and the sensor pad groups which the driving signals are not inputted into, resulting in problems of charge transfer. If change transfer happens, weakened electrical signals are obtained after a scanning process, affecting a signal-to-noise ratio (SNR) of the touch screen. When an SNR of the touch screen is relatively low, detection of touch signals would be inaccurate, contributing to problems such as functional failure of the touch screen or mistouch.

SUMMARY

The present disclosure provides a self-capacitance touch screen, a method of detecting thereof, and a device for detecting thereof, which can increase an SNR, to solve a following technical problem: when touch signals of current touch screens are detected, an SNR may be relatively low, leading to the touch signals unable to be detected.

In a first aspect, an embodiment of the present disclosure provides a method of detecting a self-capacitance touch screen, including following steps:
  simultaneously inputting same driving signals to a to-be-scanned sensor pad group and a sensor pad group adjacent to the to-be-scanned sensing electrode;
  correspondingly recognizing coordinates of touchpoints according to changes in received driving signals.

In the method, the step of simultaneously inputting same driving signals to a to-be-scanned sensing electrode and a sensor pad group adjacent to the to-be-scanned sensing electrode further includes a following step: grounding a plurality of sensor pad groups of the self-capacitance touch screen except for the to-be-scanned sensor pad group and the sensor pad group adjacent to the to-be-scanned sensor pad group.

In the method, when the to-be-scanned sensor pad group is an uppermost sensor pad group of the self-capacitance touch screen, the sensor pad group adjacent to the to-be-scanned sensor pad group is next to the to-be-scanned sensing electrode sensor pad group;
  when the to-be-scanned sensor pad group is between an uppermost sensor pad group and a lowest sensor pad group of the self-capacitance touch screen, the sensor pad groups adjacent to the to-be-scanned sensor pad group are next to and previous to the to-be-scanned sensor pad group; and
  when the to-be-scanned sensor pad group is a lowest sensor pad group of the self-capacitance touch screen, the sensor pad group adjacent to the to-be-scanned sensor pad group is previous to the to-be-scanned sensor pad group.

In a second aspect, an embodiment of the present disclosure further provides a device for detecting a self-capacitance touch screen, including a touch chip, a multiplexer, and a plurality of sensor pad groups, the touch chip includes a full sensing channel and a plurality of sensing channels, each of a plurality of sensor pads of each of the sensor pad groups is electrically connected to the full sensing channel and the sensing channels by the multiplexer; and
  the touch chip is configured to control corresponding sensing channels and input driving signals to a to-be-scanned sensor pad group, is configured to control the full sensing channel and input the same driving signals to the to-be-scanned sensor pad group, and is configured to recognize coordinates of touchpoints according to changes in received driving signals.

In the device, all sensor pads of the sensor pad groups are electrically connected to the full sensing channel, and each of the sensor pads of each of the sensor pad groups is correspondingly electrically connected to one of the sensing channels.

In the device, the full sensing channel includes a first full sensing channel and a second full sensing channel, which are respectively electrically connected to the sensor pads of each of the sensor pad groups, and each of the sensor pads of each of the sensor pad groups is correspondingly electrically connected to one of the sensing channels by the multiplexer.

In the device, the touch chip is further configured to control a corresponding sensing channel and ground the sensor pad groups except for the to-be-scanned sensor pad group and the sensor pad group adjacent to the to-be-scanned sensor pad group.

In the device, the sensor pad group adjacent to the to-be-scanned sensor pad group is an odd group, the touch chip controls the first full sensing channel to conduct functions of the same inputted driving signals, and when the sensor pad group adjacent to the to-be-scanned sensor pad group is an even group, the touch chip controls the second full sensing channel to conduct functions of the same inputted driving signals.

In the device, the multiplexer includes a first multiplexer and a second multiplexer, which are cascaded with each other, the first full sensing channel is electrically connected to the sensor pads of each of the sensor pad groups by the first multiplexer, the second full sensing channel is sequentially electrically connected to the sensor pads of each of the sensor pad groups by the first multiplexer and the second multiplexer.

In a third aspect, an embodiment of the present disclosure provides a self-capacitance screen, including a device for detecting a self-capacitance touch screen;
    wherein the self-capacitance touch screen includes a touch chip, a multiplexer, and a plurality of sensor pad groups, the touch chip includes a full sensing channel and a plurality of sensing channels, each of a plurality of sensor pads of each of the sensor pad groups is electrically connected to the full sensing channel and the sensing channels by the multiplexer; and
    the touch chip is configured to control corresponding sensing channels and input driving signals to a to-be-scanned sensor pad group, is configured to control the full sensing channel and input the same driving signals to the to-be-scanned sensor pad group, and is configured to recognize coordinates of touchpoints according to changes in received driving signals.

In the self-capacitance touch screen, all sensor pads of the sensor pad groups are electrically connected to the full sensing channel, and each of the sensor pads of each of the sensor pad groups is correspondingly electrically connected to one of the sensing channels.

In the self-capacitance touch screen, the full sensing channel includes a first full sensing channel and a second full sensing channel, which are respectively electrically connected to the sensor pads of each of the sensor pad groups, and each of the sensor pads of each of the sensor pad groups is correspondingly electrically connected to one of the sensing channels by the multiplexer.

In the self-capacitance touch screen, the touch chip is further configured to control a corresponding sensing channel and ground the sensor pad groups except for the to-be-scanned sensor pad group and the sensor pad group adjacent to the to-be-scanned sensor pad group.

In the self-capacitance touch screen, all sensor pads of the sensor pad groups are electrically connected to the full sensing channel, and each of the sensor pads of each of the sensor pad groups is correspondingly electrically connected to one of the sensing channels.

In the self-capacitance touch screen, the multiplexer includes a first multiplexer and a second multiplexer, which are cascaded with each other, the first full sensing channel is electrically connected to the sensor pads of each of the sensor pad groups by the first multiplexer, the second full sensing channel is sequentially electrically connected to the sensor pads of each of the sensor pad groups by the first multiplexer and the second multiplexer.

In the self-capacitance touch screen, the sensor pad group adjacent to the to-be-scanned sensor pad group is an odd group, the touch chip controls the first full sensing channel to conduct functions of the same inputted driving signals, and when the sensor pad group adjacent to the to-be-scanned sensor pad group is an even group, the touch chip controls the second full sensing channel to conduct functions of the same inputted driving signals.

Regarding the beneficial effects: in the present disclosure, a potential difference between a to-be-scanned sensor pad and a sensor pad group adjacent thereto may be eliminated, thereby preventing problems of charge transfer and weakened signals. Furthermore, an SNR of a self-capacitance screen may be improved, and problems, such as touch signals unable to be detected, a functional failure of a touch screen, and a mistouch, may be solved.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

Hereinafter a preferred embodiment of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

First Embodiment

Figure 1:
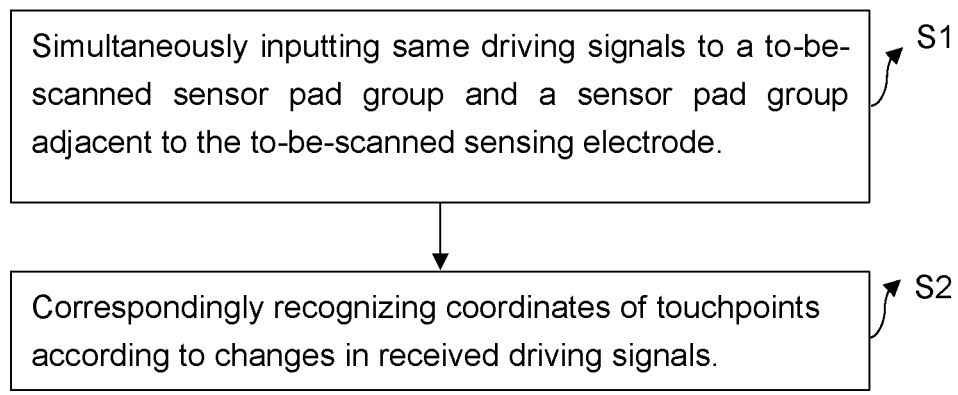
FIG. 1 is a schematic flowchart showing a method of detecting a self-capacitance touch screen provided by a first embodiment.

Please refer to FIG. 1, an embodiment provides a method of detecting a self-capacitance touch screen. Taking a self-capacitance touch screen with 14 columns and 30 rows of sensor pads as an example, there are 14×30=420 sensor pads, and each sensor pad group includes three rows of the sensor pads. The method includes steps S1-S2:

step S1, simultaneously inputting same driving signals to a to-be-scanned sensor pad group and an adjacent sensor pad group;

step S2, correspondingly recognizing coordinates of touchpoints according to changes in received driving signals.

In step S1, a number of the sensor pad group adjacent to the to-be-scanned sensing electrode may be singular or plural. In the following description, the number of the sensor pad group adjacent to the to-be-scanned sensor pad is singular.

In the present embodiment, the to-be-scanned sensor pad group is the uppermost sensor pad group of the self-capacitance touch screen, and the sensor pad group adjacent thereto is a next sensor pad group. For example, the uppermost sensor pad group includes sensor pads from first to third rows, and the sensor pad group adjacent thereto includes sensor pads from fourth to sixth rows.

When the to-be-scanned sensor pad group is between an uppermost sensor pad group and a lowest sensor pad group of the self-capacitance touch screen, the sensor pad groups adjacent to the to-be-scanned sensor pad group are previous and next sensor pad groups. For example, when the to-be-scanned sensor pad group includes the sensor pads from fourth to sixth rows, the preceding sensor pad group includes the sensor pads from first to third rows, and the next sensor pad group includes sensor pads from seventh to ninth rows.

When the to-be-scanned sensor pad group is a lowest sensor pad group of the self-capacitance touch screen, the sensor pad group adjacent to the to-be-scanned sensor pad group precedes the to-be-scanned sensor pad group. For example, when the to-be-scanned sensor pad includes the sensor pads at twenty-eighth to thirtieth rows, the preceding sensor pad includes the sensor pads at twenty-fifth to twenty-seventh rows.

In some embodiments, the step of simultaneously inputting same driving signals to a to-be-scanned sensor pad group and a sensor pad group adjacent to the to-be-scanned sensing electrode further includes a following step: grounding the sensor pad groups in the self-capacitance touch screen except for the to-be-scanned sensor pad group and the sensor pad group adjacent to the to-be-scanned sensor pad group. In the present embodiment, sensor pad groups except for the to-be-scanned sensor pad group and the adjacent sensor pad group are grounded. Therefore, a potential difference is zero, and power consumption of the self-capacitance touch screen may be effectively reduced.

In summary, when driving signals are inputted into the to-be-scanned sensor pad group, the same driving signals are inputted into the adjacent sensor pad group. Therefore, a potential difference between the to-be-scanned sensor pad group and an adjacent sensor pad group may be eliminated. Thus, problems of charge transfer and weakened signals may be prevented, an SNR of the self-capacitance touch screen may be increased, and received changes in driving signals and outputted coordinates of touchpoints are more precise, thereby solving problems such as touch signals being unable to be detected, functional failure of the touch screen, and mistouch.

Second Embodiment

Figure 2:
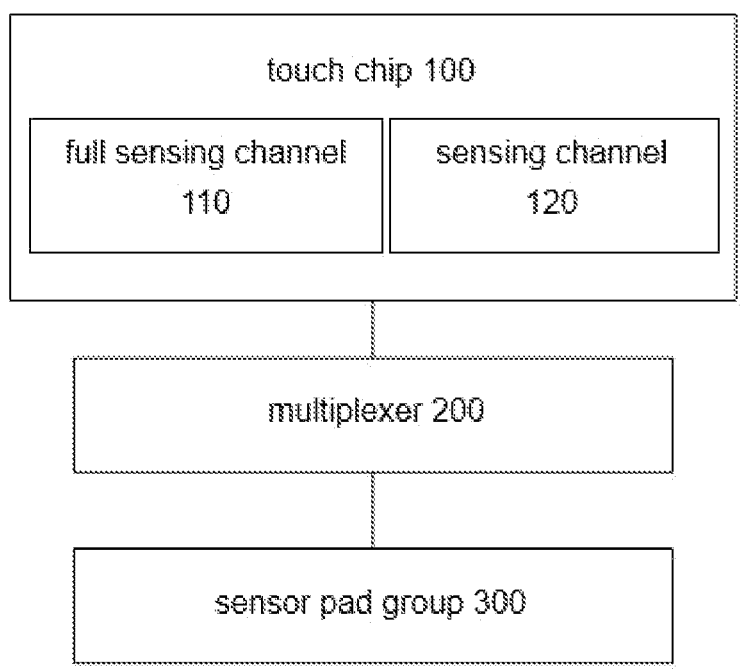
FIG. 2 is a structural diagram showing a self-capacitance touch screen provided by a second embodiment.

Based on the first embodiment, the second embodiment correspondingly provides a device for detecting a self-capacitance touch screen. Please refer to FIG. 2, the device includes a touch chip 100, a multiplexer 200, and a plurality of sensor pad groups 300. The touch chip 100 includes a full sensing channel 110 and a plurality of sensing channels 120. The multiplexer 200 is configured to electrically connect each sensor pad of each of the sensor pad groups 300 with the full sensing channel 110 and the sensing channel 120. Optionally, the multiplexer 200 may be a 1:10 demutiplexer (demux).

In the present embodiment, the touch chip 100 is configured to control corresponding sensing channels and input driving signals into a to-be-scanned sensor pad group. Also, the touch chip 100 is configured to control the full sensing channel and input the same driving signals into the sensor pad adjacent to the to-be-scanned sensor pad group. Furthermore, the touch chip 100 is configured to recognize coordinates of touchpoints according to changes in received driving signals.

Moreover, in some embodiments, the touch chip also controls a corresponding sensing channel and ground the sensor pad groups except for the to-be-scanned sensor pad group and the adjacent sensor pad groups. In the present embodiment, sensor pad groups except for the to-be-scanned sensor pad group and the adjacent sensor pad group are grounded. Therefore, a potential difference is zero, and power consumption of the self-capacitance touch screen may be effectively reduced.

In the present embodiment, a connecting method of the full sensing channel and the sensing channels is not limited. Two preferred methods are provided as follows:

(1) First method: all sensor pads of the sensor pad groups are electrically connected to the full sensing channel by the multiplexer, and each of the sensor pads of each of the sensor pad groups is correspondingly electrically connected to one of the sensing channels.

Figure 3:
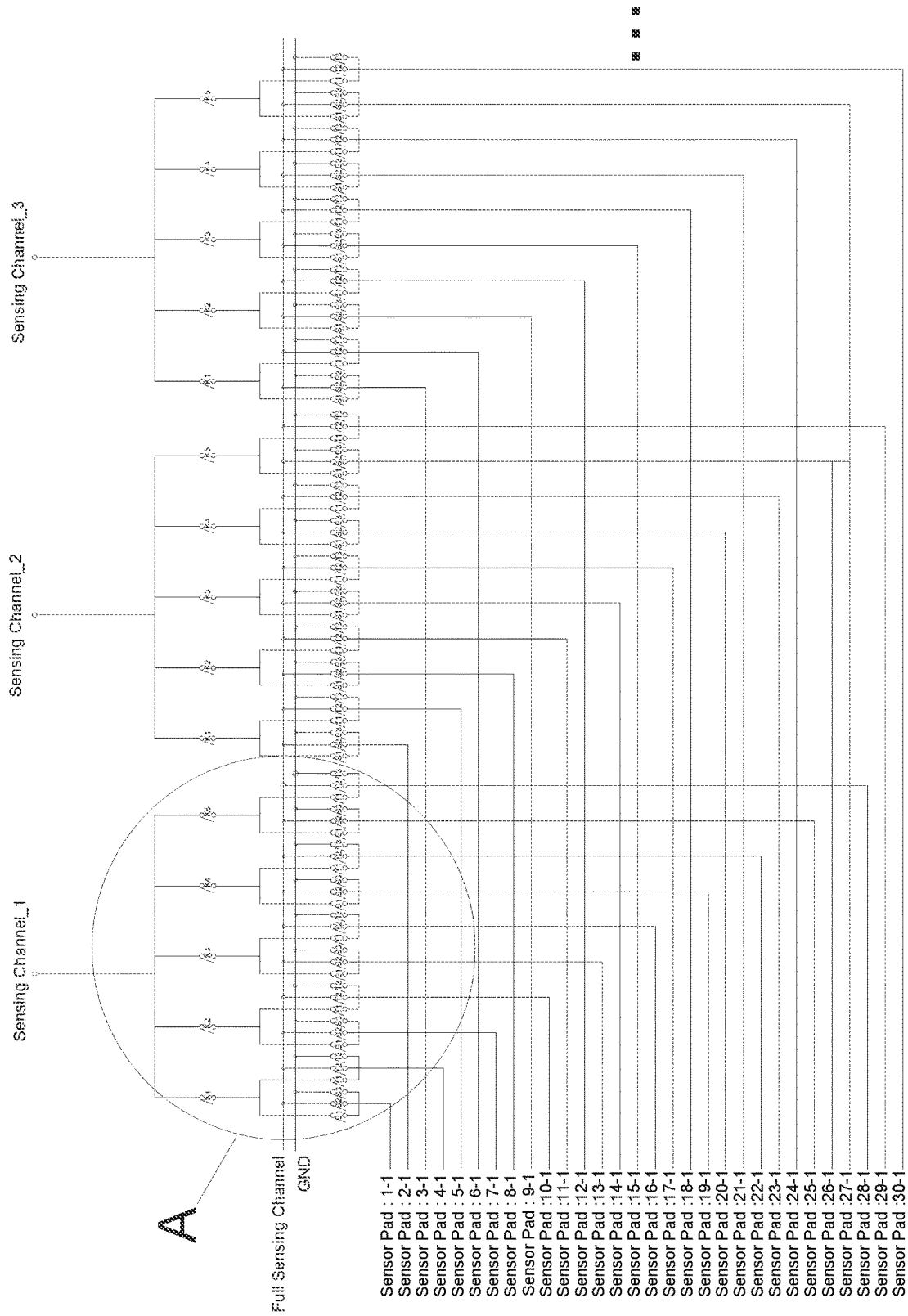
FIG. 3 is a partial circuit diagram showing a circuit structure of a full sensing channel, sensing channels, and each sensor pad provided by the second embodiment.
Figure 4:
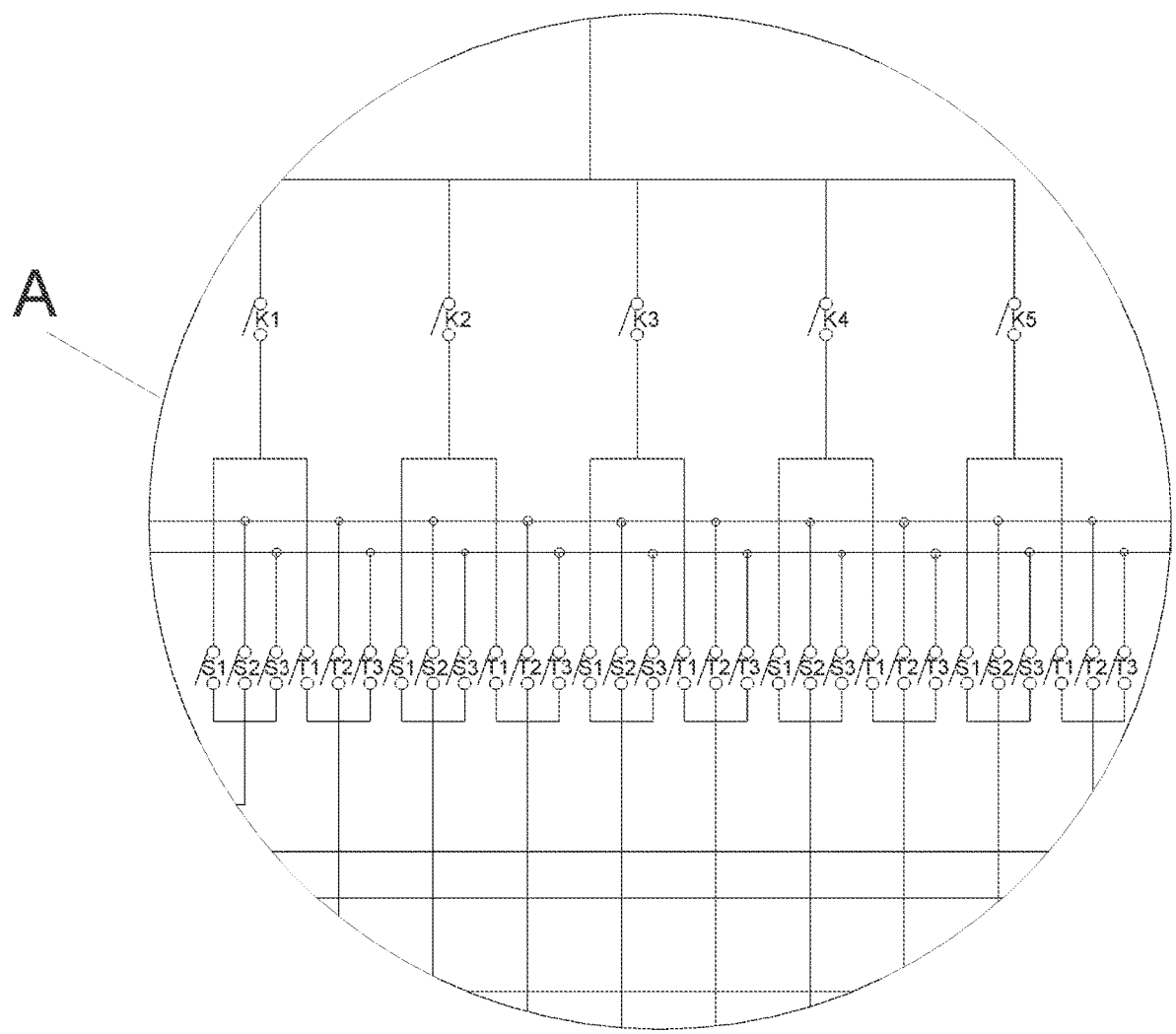
FIG. 4 is an enlarged diagram of a position A in FIG. 3.

Please refer to FIG. 3 and FIG. 4, also taking the self-capacitance touch screen with 14 columns and 30 rows of the sensor pads as an example. The self-capacitance touch screen includes a total of 420 sensor pads from sensor pad 1-1 to sensor pad 30-14 (14×30=420). Every three rows of the sensor pads form a sensor pad group, the self-capacitance touch screen includes 10 sensor pad groups, and each of the sensor pad groups includes 14×3=42 sensor pads. The multiplexer (including switches S1 to S3, T1 to T3, and K1 to K5) electrically connects all 420 sensor pads with the full sensing channel, and electrically connects 42 sensor pads of each of the sensor pad groups with 42 sensing channels (sensing channel 1 to sensing channel 42). Therefore, when touch signals are detected, the sensing channels input driving signals into corresponding sensor pads in a one-to-one manner, and the 42 sensing channels can finish driving all sensing pads in ten times.

(2) Second method: the full sensing channel includes a first full sensing channel and a second full sensing channel, which are individually electrically connected to the sensor pads of each of the sensor pad groups, and each of the sensor pads of each of the sensor pad groups is correspondingly electrically connected to one of the sensing channels by the multiplexer.

Figure 5:
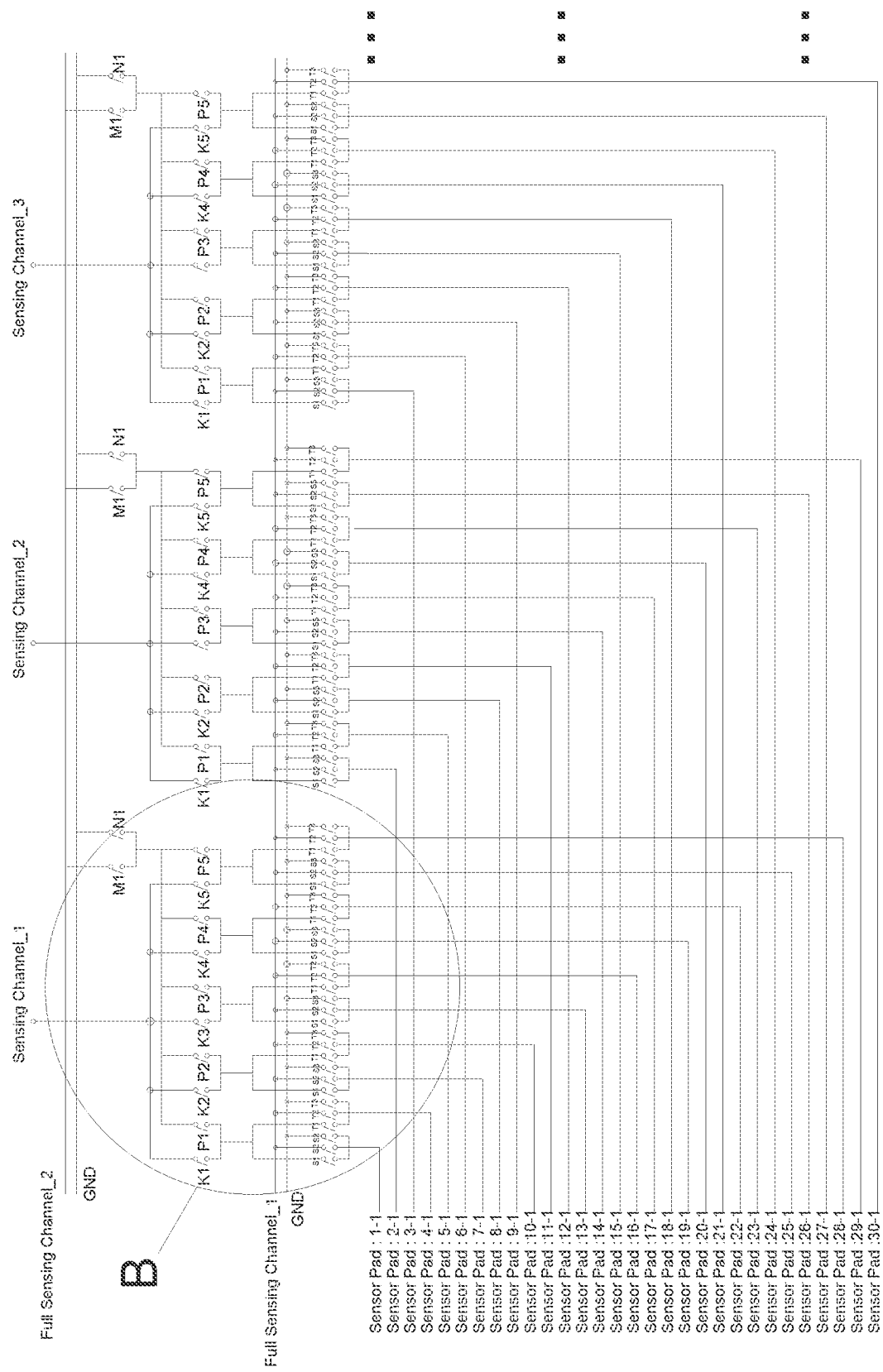
FIG. 5 is a partial circuit diagram showing another circuit structure of the full sensing channel, the sensing channels, and each sensor pad provided by the second embodiment.
Figure 6:
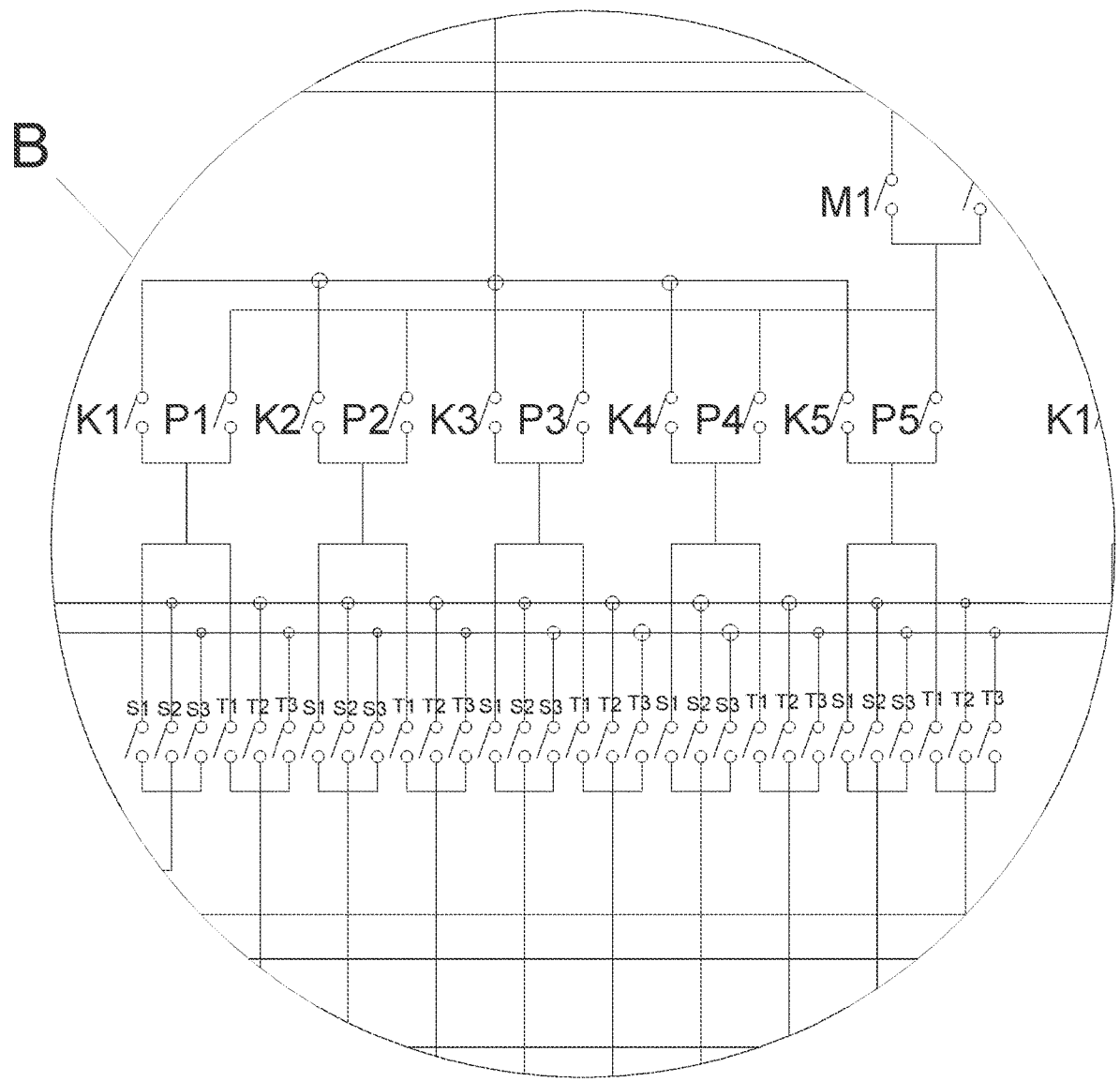
FIG. 6 is an enlarged diagram of a position B in FIG. 5.

Please refer to FIG. 5 and FIG. 6, in the second method, the full sensing channel includes a first full sensing channel (Full Sensing Channel_1) and second sensing channel (Full Sensing Channel_2), which are respectively electrically connected to all sensor pads of each of the sensor pad groups. When touch points are detected, the first sensing channel may be controlled to scan odd-numbered sensor pad groups (first to third rows and seventh to ninth rows, for example). Simultaneously, the second sensing channel may be controlled to scan even-numbered sensor pad groups (fourth to sixth rows and tenth to twelfth rows, for example). Alternatively, the first sensing channel may be controlled to scan even-numbered sensor pad groups, and the second sensing channel may be controlled to scan odd-numbered sensor pad groups.

That is, when the sensor pad group adjacent to the to-be-scanned sensor pad groups is an odd-numbered group, the touch chip controls the first full sensing channel to conduct a function of inputting same driving signals. When the sensor pad group adjacent to the to-be-scanned sensor pad groups is an even-numbered group, the touch chip controls the second full sensing channel to conduct a function of inputting same driving signals.

As a result, each of the full sensing channels only needs to drive sensor pads of half of the touch screen, thereby preventing insufficient driving capability of a single full sensing channel and simultaneously improving detection efficiency.

In some embodiments, the first full sensing channel and the second full sensing channel are electrically connected by two multiplexers and all sensor pads of each of the sensor pad groups. The multiplexer includes a plurality of first multiplexers (switches S1-S3, T1-T3, and K1-K5, as shown in FIG. 5) and a second multiplexer (switches P1-P5, M1, and N1, as shown in FIG. 5), which are cascaded with each other. The first full sensing channel is electrically connected to the sensor pads of each of the sensor pad groups by the first multiplexer. The second full sensing channel is sequentially electrically connected to the sensor pads of each of the sensor pad groups by the first multiplexer and the second multiplexer. Therefore, a driving capability of the second full sensing channel is greater than that of the first full sensing channel.

In addition, each of the sensor pads of each of the sensor pad groups is electrically connected to one corresponding sensing channel by the multiplexer (like the first method).

Because the full sensing channel of the first method or the first full sensing channel and the second full sensing channel of the second method needs to drive more sensing pads, they need to connect with a larger RC circuit, which increases charging time. Therefore, in the present embodiment, preferably, a compensation circuit is disposed in the touch chip.

Please refer to FIG. 3-FIG. 4, a control process of each of the sensor pads during detection of touchpoints is illustrated below using as an example the first method, wherein the sensor pads are divided into ten groups to be scanned.

A first group to be scanned:

The to-be-scanned sensor pad group is the uppermost sensor pad group of the self-capacitance touch screen and includes sensor pad 1-1 to sensor pad 1-14 in a first row, sensor pad 2-1 to sensor pad 2-14 in a second row, and sensor pad 3-1 to sensor pad 3-14 in a third row. There are three rows and fourteen columns of sensor pads (42 sensor pads in total) in the to-be-scanned sensor pad group. The sensor pad group adjacent to the to-be-scanned sensor pad group includes sensor pad 4-1 to sensor pad 4-14 at the fourth row, sensor pad 5-1 to sensor pad 5-14 at the fifth row, and sensor pad 6-1 to sensor pad 6-14 at the sixth row. There are 3 rows and 14 columns of sensor pads (42 sensor pads in total) in the sensor pad group adjacent to the to-be-scanned sensor pad group.

A control process includes following steps A1 to A3:

Step A1: controlling all switches K1 and S1 corresponding to the 42 sensor pads from the first to third rows to be closed. Switches S2 and S3 corresponding to the 42 sensor pads from the first to third rows are disconnected. Sensing channel_1 to sensing channel_42 of the touch chip input driving signals to the 42 sensor pads in the first to third rows and receive returning signals. The touch chip judges whether the sensor pads are touched according to corresponding changes between the driving signals and the returning signals.

Step A2: at the same time, controlling all switches T2 corresponding to the 42 sensor pads at the fourth to sixth rows to be closed. Switches T1 and T2 corresponding to the 42 sensor pads at the fourth to sixth rows are disconnected. The full sensing channel of the touch chip outputs the same driving signals to the 42 sensor pads from the fourth to sixth rows.

Step A3: at the same time, controlling switches S3 and T3 corresponding to other 336 sensor pads from seventh to thirtieth rows to be closed, and grounding the 336 sensor pads at the seventh to thirtieth rows.

A second group to be scanned:

The to-be-scanned sensor pad group includes a sensor pad 4-1 to a sensor pad 4-14 in a fourth row, a sensor pad 5-1 to a sensor pad 5-14 in a fifth row, and a sensor pad 6-1 to a sensor pad 6-14 in a sixth row. There are 3 rows and 14 columns of sensor pads (42 sensor pads in total) in the sensor pad group adjacent to the to-be-scanned sensor pad group. The sensor pad group includes two groups. One of the two groups includes sensor pad 1-1 to sensor pad 1-14 in a first row, sensor pad 2-1 to sensor pad 2-14 in a second row, and sensor pad 3-1 to sensor pad 3-14 in a third row, and there are 3 rows and 14 columns of sensor pads (42 sensor pads in total) in the group. The other group includes sensor pad 7-1 to sensor pad 7-14 in a seventh row, sensor pad 8-1 to sensor pad 8-14 in an eighth row, and sensor pad 9-1 to sensor pad 9-14 in a ninth row, and there are 3 rows and 14 columns of sensor pads (42 sensor pads in total) in the group.

A control process includes following steps B1-B3:

Step B1: controlling all switches K1 and T1 corresponding to the 42 sensor pads from the fourth to sixth rows to be closed. Switches T2 and T3 corresponding to the 42 sensor pads from the fourth to sixth rows are disconnected. The sensing channel_1 to the sensing channel_42 of the touch chip input driving signals to the 42 sensor pads from the fourth to sixth rows and receive returning signals. The touch chip judges whether the sensor pads are touched according to corresponding changes between the driving signals and the returning signals.

Step B2: at the same time, controlling all switches S2 corresponding to the 42 sensor pads from the first to third rows and the 42 sensor pads at the seventh to ninth rows to be closed. Switches S1 and S3 corresponding to the 42 sensor pads from the first to third rows and the 42 sensor pads from the seventh to ninth rows are disconnected. The full sensing channel of the touch chip outputs the same driving signals to the 42 sensor pads from the first to third rows and the 42 sensor pads from the seventh to ninth rows.

Step B3: at the same time, controlling switches S3 and T3 corresponding to other 294 sensor pads from tenth to thirtieth rows to be closed, and grounding the 294 sensor pads from the tenth to thirtieth rows.

A structure and a controlling step of a third group to be scanned to an eighth group to be scanned can be inferred according to the first group to be scanned and the second group to be scanned.

A ninth group to be scanned:

The to-be-scanned sensor pad group includes sensor pad 25-1 to sensor pad 25-14 in a twenty-fifth row, sensor pad 26-1 to sensor pad 26-14 in a twenty-sixth row, and sensor pad 27-1 to sensor pad 27-14 in a twenty-seventh row. There are 3 rows and 14 columns of sensor pads (42 sensor pads in total) in the to-be-scanned sensor pad group. The sensor pad group adjacent to the to-be-scanned pad group includes two groups. One of the two groups includes sensor pad 22-1 to sensor pad 22-14 in a twenty-second row, sensor pad 23-1 to sensor pad 23-14 in a twenty-third row, and sensor pad 24-1 to sensor pad 24-14 in a twenty-fourth row, and there are 3 rows and 14 columns of sensor pads (42 sensor pads in total) in the group. The other group includes sensor pad 28-1 to sensor pad 28-14 in a twenty-eighth row, sensor pad 29-1 to sensor pad 29-14 in a twenty-ninth row, and sensor pad 30-1 to sensor pad 30-14 in a thirtieth row, and there are 3 rows and 14 columns of sensor pads (42 sensor pads in total) in the group.

A control process comprising following steps I1-I3:

Step I1: controlling all switches K1 and S1 corresponding to the 42 sensor pads from the twenty-fifth to twenty-seventh rows to be closed. Switches S2 and S3 corresponding to the 42 sensor pads from the twenty-fifth to twenty-seventh rows are disconnected. The sensing channel_1 to the sensing channel_42 of the touch chip input driving signals to the 42 sensor pads at the twenty-fifth to twenty-seventh rows, and receive returning signals. The touch chip judges whether the sensor pads are touched according to corresponding changes between the driving signals and the returning signals.

Step I2: at the same time, controlling all switches T2 corresponding to the 42 sensor pads from the twenty-second to twenty-fourth rows and the 42 sensor pads from the twenty-eighth to thirtieth rows to be closed. Switches T1 and T3 corresponding to the 42 sensor pads from the twenty-second to twenty-fourth rows and the 42 sensor pads from the twenty-eighth to thirtieth rows are disconnected. The full sensing channel of the touch chip outputs the same driving signals to the 42 sensor pads from the twenty-second to twenty-fourth rows and the 42 sensor pads from the twenty-eighth to thirtieth rows.

Step I3: at the same time, controlling switches S3 and T3 corresponding to the other 294 sensor pads in the first to twenty-first rows to be closed and grounding the 294 sensor pads in the first to twenty-first rows.

A tenth group to be scanned:

The to-be-scanned sensor pad group is a lowest sensor pad group of the self-capacitance touch screen and includes a sensor pad 28-1 to a sensor pad 28-14 in a twenty-eighth row, a sensor pad 29-1 to a sensor pad 29-14 in a twenty-ninth row, and a sensor pad 30-1 to a sensor pad 30-14 in a thirtieth row. There are 3 rows and 14 columns of sensor pads (42 sensor pads in total) in the to-be-scanned sensor pad group. The sensor pad group adjacent to the to-be-scanned sensor pad group includes a sensor pad 25-1 to a sensor pad 25-14 in the twenty-fifth row, a sensor pad 26-1 to a sensor pad 26-14 in a twenty-sixth row, and a sensor pad 27-1 to a sensor pad 27-14 in a twenty-seventh row. There are 3 rows and 14 columns of sensor pads (42 sensor pads in total) in the to-be-scanned sensor pad group.

A control process includes following steps J1 to J3:

Step J1: controlling all switches K1 and T1 corresponding to the 42 sensor pads from the twenty-eighth to thirtieth rows to be closed. Switches T2 and T3 corresponding to the 42 sensor pads from the twenty-eighth to thirtieth rows are disconnected. The sensing channel_1 to the sensing channel_42 of the touch chip input driving signals to the 42 sensor pads from the twenty-eighth to thirtieth rows, and receive returning signals. The touch chip judges whether the sensor pads are touched according to corresponding changes between the driving signals and the returning signals.

Step J2: at the same time, controlling all switches S2 corresponding to the 42 sensor pads from the twenty-fifth to twenty-seventh rows to be closed. Switches S1 and S3 corresponding to the 42 sensor pads from the twenty-fifth to twenty-seventh rows are disconnected. The full sensing channel of the touch chip outputs the same driving signals to the 42 sensor pads from the twenty-fifth to twenty-seventh rows.

Step J3: at the same time, controlling switches S3 and T3 corresponding to the last 336 sensor pads from the first to twenty-fourth rows to be closed, and grounding the 336 sensor pads from the first to twenty-fourth rows.

So far, ten groups have been scanned.

A control process of the second method is similar to the control process of the first method. A difference therebetween is: in the second method, two full sensing channels (full sensing channel_1 and full sensing channel_2) can each drive the sensor pads of half of the touch screen.

Any method mentioned in the first embodiment may be applied to the second embodiment, and the second embodiment includes corresponding beneficial effects of the first embodiment, which is not described here.

Based on the second embodiment, the present disclosure further provides a self-capacitance touch screen, including the device for detecting a self-capacitance touch screen mentioned in the second embodiment. The self-capacitance touch screen can realize all functions of the device of the second embodiment. A technical solution of the self-capacitance touch screen may be understood with reference to the second embodiment, and is not described here.

The description of the above embodiments is only used to help understand the core idea of the present disclosure. For those skilled in the art, specific embodiments and applications may be modified according to the spirit of the present disclosure. In summary, the contents of the specification shall not be construed as causing limitations to the present disclosure.

What is claimed is:

1. A device for detecting a self-capacitance touch screen, comprising a touch chip, a multiplexer, and a plurality of sensor pad groups, wherein the touch chip comprises a full sensing channel and a plurality of sensing channels, each of the sensor pads of each of the sensor pad groups is electrically connected to the full sensing channel and the sensing channels by the multiplexer; and the touch chip is configured to control a corresponding one of the sensing channels to input driving signals to a to-be-scanned sensor pad group of the sensor pad groups, is configured to control the full sensing channel to input the same driving signals to a sensor pad group of the sensor pad groups adjacent to the to-be-scanned sensor pad group, and is configured to recognize coordinates of touchpoints according to changes in received driving signals, wherein the full sensing channel comprises a first full sensing channel and a second full sensing channel, each of which is electrically connected to the sensor pads of each of the sensor pad groups, and the respective sensor pads of each of the sensor pad groups are electrically connected to a corresponding one of the sensing channels by the multiplexer, and wherein the touch chip is configured to, when the sensor pad group adjacent to the to-be-scanned sensor pad group is an odd-numbered group, control the first full sensing channel to input the same driving signals, and when the sensor pad group adjacent to the to-bescanned sensor pad group is an even-numbered group, control the second full sensing channel to input the same driving signals.

2. The device for detecting the self-capacitance touch screen of claim 1, wherein the touch chip is further configured to control one or more of the sensing channels to ground ones of the sensor pad groups except for the to-be-scanned sensor pad group and the sensor pad group adjacent to the to-be-scanned sensor pad group.

3. The device for detecting the self-capacitance touch screen of claim 1, wherein the multiplexer comprises a first multiplexer and a second multiplexer, which are cascaded with each other, the first full sensing channel is electrically connected to the sensor pads of each of the sensor pad groups by the first multiplexer, the second full sensing channel is sequentially electrically connected to the sensor pads of each of the sensor pad groups by the first multiplexer and the second multiplexer.

4. A self-capacitance touch screen, comprising a device for detecting the self-capacitance touch screen;
wherein the device for detecting self-capacitance touch screen comprises a touch chip, a multiplexer, and a plurality of sensor pad groups; the touch chip comprises a full sensing channel and a plurality of sensing channels; each of a plurality of sensor pads of each of the sensor pad groups is electrically connected to the full sensing channel and the sensing channels by the multiplexer; and
the touch chip is configured to control a corresponding one of the sensing channels to input driving signals to a to-be-scanned sensor pad group of the sensor pad groups, is configured to control the full sensing channel to input the same driving signals to a sensor pad group of the sensor pad groups adjacent to the to-be-scanned sensor pad group, and is configured to recognize coordinates of touchpoints according to changes in received driving signals,
wherein the full sensing channel comprises a first full sensing channel and a second full sensing channel, each of which is electrically connected to the sensor pads of each of the sensor pad groups, and the respective sensor pads of each of the sensor pad groups are electrically connected to a corresponding one of the sensing channels by the multiplexer, and
wherein the touch chip is configured to, when the sensor pad group adjacent to the to-be-scanned sensor pad group is an odd-numbered group, control the first full sensing channel to input the same driving signals, and when the sensor pad group adjacent to the to-be-scanned sensor pad group is an even-numbered group, control the second full sensing channel to input the same driving signals.

5. The self-capacitance touch screen of claim 4, wherein the touch chip is further configured to control one or more of the sensing channels to ground ones of the sensor pad groups except for the to-be-scanned sensor pad group and the sensor pad group adjacent to the to-be-scanned sensor pad group.

6. The self-capacitance touch screen of claim 4, wherein the multiplexer comprises a first multiplexer and a second multiplexer which are cascaded with each other, the first full sensing channel is electrically connected to the sensor pads of each of the sensor pad groups by the first multiplexer, and the second full sensing channel is sequentially electrically connected to the sensor pads of each of the sensor pad groups by the second multiplexer and the first multiplexer.

* * * * *